(12) United States Patent
Zäh et al.

(10) Patent No.: US 7,101,929 B2
(45) Date of Patent: Sep. 5, 2006

(54) POLYOLEFIN FILMS WITH IMPROVED PROCESSING PROPERTIES

(75) Inventors: Matthias Zäh, Gersthofen (DE); FranzLeo Heinrichs, Gablingen (DE); Reiner Hess, Gersthofen (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 10/514,851

(22) PCT Filed: May 15, 2003

(86) PCT No.: PCT/IB03/02012

§ 371 (c)(1),
(2), (4) Date: Jun. 24, 2005

(87) PCT Pub. No.: WO03/097722

PCT Pub. Date: Nov. 27, 2003

(65) Prior Publication Data

US 2005/0239944 A1 Oct. 27, 2005

(30) Foreign Application Priority Data

May 16, 2002 (DE) ................. 102 21 707

(51) Int. Cl.
*C08L 91/06* (2006.01)
*C08K 5/01* (2006.01)
(52) U.S. Cl. ................. 524/487; 524/488; 524/489; 428/348; 428/484.1; 428/523
(58) Field of Classification Search ............. 524/487, 524/488, 489; 428/348, 484.1, 523
See application file for complete search history.

(56) References Cited

U.S. PATENT DOCUMENTS 5,006,587 A 4/1991 Fielding
5,155,160 A * 10/1992 Yeh et al. ............. 524/487
5,720,914 A * 2/1998 Bremner et al. ........ 264/178 R
6,033,514 A * 3/2000 Davis et al. ........... 156/244.11
6,613,430 B1 * 9/2003 Culbertson et al. ......... 428/352

FOREIGN PATENT DOCUMENTS

GB 2262472 6/1993
WO WO 02/12385 2/2002

OTHER PUBLICATIONS

PCT ISR for PCT/IB 03/02012, Aug. 12, 2003.
PCT IPER for PCT/IB 03/02012, Jan. 23, 2004.
"Hysafe® hydrotalcite is a Chemically Synthesized, Fine Particle size, Magnesium Aluminum Hydroxy Carbonate", http://ww.huberend.com/HuberRoffFolder/Hysafe_549.html, Jan. 28, 2002.
Amos, "Fluoropolymer-based PPA is Claimed to Reduce Die Buildup, Lower Gel Formation, & Reduce Maintenance Downtime", http://search.chemweek.com/2mp/start_search/1000/10mp%252fTech%20paper (Lo) .HTM.
Pauquet et al, "Novel Stabilization Chemistry to Avoid Water Carry-over in tape & film Extrusion," Ciba Specialty Chemicals Inc., Basel, Switzerland, Research Disclosure, pp. 1191 & 1192; Sep. 1998.
"Great Lakes Launches New Polymer Additions at K 2001," Fehler! Textmarke Nicht Definiert; Oct. 29, 2001.
Ullmanns Encyclopedia of Industrial Chemistry, vol. A 28, *Waxes*, pp. 103-163; 1996.

* cited by examiner

*Primary Examiner*—Ling-Sui Choi
(74) *Attorney, Agent, or Firm*—Anthony A. Bisulca

(57) ABSTRACT

The present invention relates to a process for reducing water carry-over during the production of polyolefin films or polyolefin tapes which are passed through a waterbath, where the polyolefin formulation comprises polyolefin waxes. The results are that less water is carried over and that the products have higher quality and better processing properties.

9 Claims, No Drawings

POLYOLEFIN FILMS WITH IMPROVED PROCESSING PROPERTIES

The present invention relates to a process for reducing water carry-over during the production of polyolefin films or polyolefin tapes which are passed through a waterbath.

A widespread method for producing polyolefin films and polyolefin tapes consists in extruding the polymer melt through a suitable apparatus and, in the form of a film, into a waterbath, where the film is cooled and solidified. This film is then turn passed out of the waterbath and subjected to further steps of processing. On emerging from the waterbath the film can entrain water, which interferes with subsequent steps of processing. This effect, the entrainment of water from the waterbath, is often termed "water carry-over" in the technical literature, and this can be abbreviated to WCO.

Stretching of the film at a suitable temperature results in orientation and further crystallization of the polymer, resulting in the specific properties. This second step of processing may take place directly on the film, but the primary film is often split into tapes prior to the stretching process.

Since the desired properties are obtained during the stretching process, precise adherence to all process parameters is essential here. Even traces of moisture on the film or on the tapes prior to the stretching process alter the subsequent stretching and orientation so as to produce very severe variations in the quality of the product obtained. The effects of this go beyond merely the corresponding major variations in the quality of the resultant final product. Even during production or processing, the poor quality can cause breakoffs of the tapes, for example, and thus stop production.

A source of water which can lead to the problems mentioned is the cooling bath into which the primary film is extruded. Although most plastics, in particular the polyolefins, such as polyethylene (PE) or polypropylene (PP) are very hydrophobic and therefore have little tendency to absorb water, it is frequently found that at relatively high production speeds water droplets or a thin film of water adhere to the film when this is drawn over the waterbath. In addition, various additives have to be added to the polymer to ensure that the final product has good functionality. Some of these additives contribute to increased entrainment of water from the waterbath.

The additives, and also a maximum processing speed, are essential if suitable products are to be produced at low cost. A reduction in processing speed leads to uneconomic production. The addition of necessary additives, some of which lead to a worsening of WCO (i.e. more WCO and therefore poorer product) is also impossible to avoid, because otherwise the product properties brought about by the additives cannot be achieved.

The reduction of WCO is currently promoted via simple design measures during machinery manufacture. For example, the draw-off of the film from the waterbath is usually vertically upward, so that gravity alone maximizes the amount of water dropping away. In addition, use is often made of squeeze rollers and/or air knives to remove the maximum amount of water from the film. There are other technical methods, depending on the specific configuration of the machine, but there is no intention to give a comprehensive list of these here.

However, besides purely design-related methods, there are also other methods for improving WCO. One approach here is to improve WCO by using additives which have no adverse effect on WCO.

For example, a brochure of J. M. Huber Corp. Atlanta, Ga. 30327 (http://www.huberemd.com/HuberRootFolder/Hysafe_549.html) describes the use of Hysafe 539 or 549 hydrotalcite instead of metal stearates as acid scavenger, to improve WCO.

Another additive with a favourable effect on WCO is described by Great Lakes in the brochure for Anox 330, a phenolic antioxidant.

There are also specific process stabilizers with low contribution to WCO. Research Disclosure September 1998/ 1191 (41342) describes the use of benzofuranones to improve WCO during the production of tapes.

In addition, fluorine-containing processing aids are recommended for improving WCO (Internet article from Chemical Week, Author Steve Amos, Dyneon: http://search.chemweek.com/~mp/start_search/1000/10MP %252fTech %20paper(Lo). H TM).

These are specific additives which can possibly lead to improvement in a specific instance, but require a complete reformulation, which in turn can then give rise to complicated laboratory trials.

Another approach is described in GB 2262472. WCO is claimed to be favourably affected by adding hypohalites to the water in the waterbath, whatever the components present in the formulation. However, the use of hypohalites, which are strong oxidants, is attended by risks and disadvantages.

According to U.S. Pat. No. 5,006,587, fluoroborates also have a favourable effect on WCO. However, here again the side effects resulting from fluorine-containing compounds have to be considered.

There therefore continues to be a requirement for a process for improving WCO during the production of polyolefin films and polyolefin tapes. Ideally, no undesirable side-effects should arise, and the process should also be capable of problem-free use for existing formulations.

Surprisingly, it has now been found that addition of waxes can markedly reduce WCO during the production of polyolefin films and polyolefin tapes. This is unexpected particularly because polyolefin waxes differ from the polymer solely in their chain length. It was completely surprising and in no way predictable that this difference alone results in such a large improvement in WCO.

The invention therefore provides a process for reducing water carry-over (WCO) during the production of polyolefin films or polyolefin tapes which are passed through a waterbath, by using a polyolefin formulation which comprises at least one polyolefin wax.

The polyolefin wax is a polar or non-polar polyethylene wax or a polar or non-polar polypropylene wax.

Polar polyolefin waxes are produced by appropriate modification of non-polar waxes by processes known in principle, e.g. by oxidation with oxygen-containing gases, such as air, and/or by the grafting-on of polar olefin monomers, such as $\alpha,\beta$-unsaturated carboxylic acids and/or derivatives of these, e.g. acrylic acid, acrylic esters, maleic anhydride, mono- or dialkyl maleates. Polar polyolefin waxes may moreover be prepared by copolymerization of ethylene with polar comonomers, such as vinyl acetate or acrylic acid, or else by oxidative degradation of higher-molecular-weight, non-waxy ethylene homo- or copolymers. Appropriate examples are found in Ullmann's Encyclopedia of Industrial Chemistry, 5th Edn., Vol. A 28, Weinheim 1996, section on waxes, pp. 103–163, for example.

Non-polar polyolefin waxes may be prepared by thermal degradation of branched or unbranched polyolefins, such as polyethylene or of 1-olefin homo- or copolymers, e.g. polyethylene or polypropylene, or by direct polymerization of olefins. Examples of polymerization processes which may be used are free-radical processes where the olefins, generally ethylene, are reacted at high pressures and temperatures to give waxes with various degrees of branching, and processes in which ethylene and/or higher 1-olefins are polymerized with the aid of organometallic catalysts, such as Ziegler-Natta or metallocene catalysts, to give unbranched or branched waxes. 1-olefins used are linear or branched olefins having from 3 to 18 carbon atoms, preferably from 3 to 6 carbon atoms, and these olefins may also contain polar functions, such as ester groups or acid groups. Examples hereof are propene, 1-butene, 1-hexene, 1-octene, or 1-octadecene, vinyl acetate, acrylic acid, acrylic esters, such as methyl acrylate or ethyl acrylate. Preference is given to homopolymers of ethylene or propylene, or copolymers of these with each other. The copolymers are composed of from 70 to 99.9% by weight, preferably from 80 to 99% by weight, of a single type of olefin. Appropriate methods of preparing olefin homo- and copolymer waxes are described by way of example in Ullmann's Encyclopedia of Industrial Chemistry, $5^{th}$ Edn., Vol. A 28, Weinheim 1996, section on waxes, in Chapter 6.1.1./6.1.2. (High-pressure polymerization), Chapter 6.1.2. (Ziegler-Natta polymerization, polymerization using metallocene catalysts) and Chapter 6.1.4. (Thermal degradation).

Particularly suitable materials are unmodified or polar-modified waxes with a weight-average molar mass Mw of from 1000 to 50 000 g/mol, with a number-average molar mass Mn of from 700 to 10 000 g/mol, with a drop point or softening point of from 70 to 170° C. measured by the ring/bore method, with a melt viscosity of from 5 to 50 000 mPa.s, measured at a temperature 10° C. above the drop point or softening point, and with an acid value of from 0 to 100 mg KOH/g, and with a saponification value of from 0 to 150 mg KOH/g.

The usual amounts used of the waxes are from 0.001 to 10% by weight, specifically from 0.01 to 3% by weight, more specifically from 0.05 to 1% by weight.

The waxes are incorporated into the polymer by the usual processes, either directly in the form of pellets, powder, micropowder, or as masterbatch, alone or together/as a mixture with additives. The incorporation may take place in a combined step of the process, or else in separate steps—i.e. solely incorporation of the waxes. The waxes may also be added at an earlier stage, during polymer preparation.

Examples of relevant polymers are polymers described in WO 02/12385 A1 on page 7, line 23 to page 13, line 9.

Examples of relevant additives which may also be present in the polymer are additives described in WO 02/12385 A1 on page 13, line 21 to page 26, line 27.

The polymers and additives mentioned in WO 02/12385 A1 are hereby expressly incorporated into the subject-matter of the present application by way of reference.

The films or tapes may also have pigmentation, in which case the wax can also promote the dispersion of the pigments.

The films or tapes are produced by the usual processes, whereupon the use according to the invention of the waxes described above reduces WCO and leads to higher quality or higher processing speed.

The examples below are intended to provide non-limiting illustration of the invention.

EXAMPLES

To incorporate the additives, premixes were prepared at 190° C. in a kneader, and these were subsequently diluted in the ratio premix:polymer=1:2 in the extruder to give the final concentration.

The mixture was then processed at from 210 to 270° C. in an extruder (95 rpm), and extruded by way of a flat-film die (width 400 mm) in the form of a film into the water-bath. The temperature of the waterbath was maintained at from 19 to 23° C. The flat film was drawn off at a speed of 6 m/min, the resultant film thickness being about 150 μm. WCO was visually assessed using the following grades as the film emerged from the waterbath:

No WCO: no water carry-over observed

Moderate WCO: visible water carry-over

Poor WCO: it is desirable for water-carryover to be minimized, i.e. No WCO.

TABLE

Results of WCO experiments

| LS 1 | Wax | WCO |
| --- | --- | --- |
| 0.2% by weight | — | Moderate |
| 0.2% by weight | 0.1% by weight W 1 | None |
| 0.2% by weight | 0.1% by weight W 2 | None |

The polymer used comprised isotactic polypropylene with MFI of 30 g/min.

LS 1 is Hostavin® N30 from Clariant, a polymer of epichlorohydrin and 2,2,4,4-tetra-methyl-7-oxa-3,20-diaza-20-(2,3-epoxypropyl)dispiro[5.1.11.2]heneicosan-21-one.

W 1 is Licowax® VP 220 from Clariant, with a softening point of from 160 to 166° C. and with a viscosity of about 1700 mPas at 170° C.

W 2 is Licowax® PE 130 from Clariant with a drop point of from 127 to 132° C. and with a viscosity of about 300 mPas at 140° C.

As can clearly be seen, addition of the waxes leads to a significant improvement in WCO.

The invention claimed is:

1. A process for reducing water carry-over during the production of a polyolefin film or polyolefin tape which is passed through a waterbath, comprising the step of providing a polyolefin formulation wherein the polyolefin formulation includes at least one polyolefin wax, wherein the at least one polyolefin wax has a weight-average molar mass Mw of from 4800 to 50 000 g/mol, and wherein the at least one polyolefin wax is incorporated into the polyolefin formulation.

2. The process according to claim 1, wherein the at least one polyolefin wax is a polar or non-polar polyethylene wax or a polar or non-polar polypropylene wax.

3. The process according to claim 1, wherein the at least one polyolefin wax is an unmodified or polar-modified wax with a number-average molar mass Mn of from 700 to 10 000 g/mol, with a drop point or softening point of from 70 to 170° C. measured by the ring/bore method, with a melt viscosity of from 5 to 50 000 mPa.s, measured at a temperature 10° C. above the drop point or softening point, with an acid value of from 0 to 100 mg KOH/g, and with a saponification value of from 0 to 150mg KOH/g.

4. The process according to claim 1, wherein the at least one polyolefin wax is prepared by Ziegler-Natta or metallocene catalysts.

5. The process according to claim 1, wherein the polyolefin wax is used at a concentration of from 0.01 to 3% by weight of the polyolefin formulation.

6. A polyolefin film or polyolefin tape made in accordance with the process of claim 1.

7. A Polyolefin film or polyolefin tape with reduced water carry-over or passage through a waterbath, comprising a polyolefin formulation and wherein the polyolefin formulation includes at least one polar or non-polar polyethylene wax or polar or non-polar polypropylene wax, prepared by Ziegler-Natta or metallocene catalysts, wherein the at least one polar or non-polar polyethylene wax or polar or non-polar polypropylene wax, prepared by Ziegler-Natta or metallocene catalysts has a weight-average molar mass Mw of from 4800 to 50 000 g/mol, and wherein the at least one polar or non-polar polyethylene wax or polar or non-polar polypropylene wax, prepared by Ziegler-Natta or metallocene catalysts is incorporated into the polyolefin formulation.

8. A polyolefin film or polyolefin tape according to claim 7, wherein the at least one polar or non-polar polyethylene wax or polar or non-polar polypropylene wax, prepared by Ziegler-Natta or metallocene catalysts further comprises at least one unmodified or polar-modified wax with a number-average molar mass Mn of from 700 to 10 000 g/mol, with a drop point or softening point of from 70 to 170° C. measured by the ring/bore method, with a melt viscosity of from 5 to 50 000 mPa.s, measured at a temperature 10° C. above the drop point or softening point, with an acid value of from 0 to 100 mg KOH/g, and with a saponification value of from 0 to 150 mg KOH/g.

9. A polyolefin film or polyolefin tape according to claim 7 further comprising at least one pigment.

* * * * *